United States Patent

Saari

[11] Patent Number: 5,231,836
[45] Date of Patent: Aug. 3, 1993

[54] TWO-STAGE CONDENSER

[75] Inventor: Risto Saari, Luoma, Finland

[73] Assignee: Inventio Oy, Luoma, Finland

[21] Appl. No.: 777,373

[22] PCT Filed: May 24, 1990

[86] PCT No.: PCT/FI90/00145
§ 371 Date: Nov. 27, 1991
§ 102(e) Date: Nov. 27, 1991

[87] PCT Pub. No.: WO90/14873
PCT Pub. Date: Dec. 13, 1990

[30] Foreign Application Priority Data

May 31, 1989 [FI] Finland .................. 892655

[51] Int. Cl.⁵ .................. B01D 5/00; B01D 53/14; D21C 11/06; F25B 43/04
[52] U.S. Cl. .................. 62/18; 62/55.5; 62/275; 55/68; 423/234
[58] Field of Search .................. 62/18, 475, 55.5; 55/68; 423/234

[56] References Cited

U.S. PATENT DOCUMENTS

| | | | |
|---|---|---|---|
| 3,771,317 | 11/1973 | Nichols | 62/54 |
| 3,984,523 | 10/1976 | Schafer et al. | 423/240 |
| 4,313,916 | 2/1982 | Jones, Jr. | 423/226 |
| 4,329,199 | 5/1982 | Andersson et al. | 162/19 |
| 4,329,320 | 5/1982 | Vydra et al. | 423/234 X |
| 4,406,867 | 9/1983 | Marcinkowsky et al. | 423/226 |
| 4,469,668 | 9/1984 | Spevack | 423/234 X |

FOREIGN PATENT DOCUMENTS

| | | |
|---|---|---|
| 33048 | 10/1963 | Finland . |
| WO88/06481 | 9/1988 | PCT Int'l Appl. . |
| 163407 | 5/1958 | Sweden . |
| 319078 | 12/1969 | Sweden . |
| 451334 | 9/1987 | Sweden . |

Primary Examiner—Henry A. Bennett
Assistant Examiner—Christopher B. Kilner
Attorney, Agent, or Firm—Nixon & Vanderhye

[57] ABSTRACT

First and second indirect contact condensing heat exchangers are used to separate gases from a mixture of condensible and non-condensible gases, such as the vapor from the last stage of a black liquor evaporation plant of a pulp mill. The mixture of gases passes over the first heat exchanger to cool and condense, producing a first condensate and a first remaining gas stream. The condensate is removed from the first remaining gas stream, the gas stream then being passed over the second heat exchanger. A medium for absorbing at least one non-condensible gas in the first gas stream—such as an NaOH liquid solutino—is passed over the surface of the second heat exchanger to absorb gas, and produce a second remaining gas stream (containing primarily air). The second gas stream is separated from the solution with absorbed gas. The solution with absorbed gas may be used as white liquor in kraft pulping in a pulp mill, without concentrating the solution.

12 Claims, 1 Drawing Sheet

TWO-STAGE CONDENSER

BACKGROUND AND SUMMARY OF THE INVENTION

The present invention relates to a condenser apparatus and method for condensing gases in two subsequent stages, in the last of which the gases are condensed by means of an absorption medium.

The existence of noncondensable gases is, as is well known, a problem substantially affecting the design and development of a condenser. If it is not possible to effectively separate them from the condensable gases, it is necessary to pump great amounts of them out of the process, which again results in great losses of energy and material.

In some processes, as in condensing of water vapor the question is only of separating condensable and non-condensable gases, generally steam and air, from each other by cooling the gas mixture. In some cases, as for example, in chemical pulp and paper industry there are, also third type gases which gases are noncondensable at the normally used pressures and temperatures, but said gases may be separated from the gas mixture by absorbing them to an appropriate absorption medium.

When a mixture of three such different types of gases is condensed in a conventional condenser, all the noncondensable gases are pumped from the condenser and, according to the pressure and temperature, also a lot of steam with them.

Another known technique is to condense the gas mixture to an absorption medium. Since condensable gases, such as water vapor, forms the majority of the gas mixture being treated, the absorption medium considerably concentrates from the condensing material. Thus it becomes necessary to concentrate it separately by vaporizing the condensed material therein again. This again results in additional use of energy.

It is possible to avoid or minimize the problems of the known methods by using the method in accordance with the present invention. It is not necessary to re-evaporate the condensable material nor is it necessary to pump huge amounts of steam with the noncondensable gases.

The present invention is characterized by a condenser, which comprises cooled heat exchangers of some known construction and which is divided relative to the flow into two subsequent sections, in the latter of which a medium for absorbing gases flows on the surfaces of the heat exchangers, and the noncondensable gases are discharged from the condenser after they have flowed through both sections.

Such a condenser may be located in one casing and the first and second section may be separated by a partition, over which tne gases may flow from the first section to the second. It may also be installed into two separate casings, which are connected by the flow channel of gases.

In the first section the majority of the condensable gases is condensed and becomes liquid on the surfaces of the heat exchangers. When the gas mixture at the same time cools, the partial pressure of the noncondensable gases increases. A mixture including a substantial amount of non-condensible gases flow to the second section of the condenser, wherein the noncondensable, but yet absorbable gases are absorbed into the absorption medium flowing along the surfaces of the heat exchangers.

The absorption medium may be a concentrated solution of an electrolyte, for example NaOH, in which the vapor pressure of the water therein is considerably lower than that of pure water at a corresponding temperature. Therefore, the water vapor in the gas mixture also absorbs into this kind of absorption medium. In order to avoid the absorption of unnecessarily large mixture amounts to dilute the absorption solution, the first stage of the condenser must be dimensioned in such a way that the gas mixture cools sufficiently and that the condensing of the water vapor therein would be as complete as possible.

This heat exchangers of the second section cool the absorption medium so as not to permit the vapor pressure increase when the gases absorb, but that the pressure of the second section would remain below the pressure of the first section. In order to create a sufficient rinsing of the heat exchangers, it is possible to return absorption liquid with a pump to flow again to the heat exchange surfaces.

When the absorbable gases have absorbed in the second section of the condenser, the partial pressure of the actual noncondensable gases has grown significant and the gases are discharged from the condenser after they have flowed through both sections.

An example of the prior art technique is an evaporation plant of black liquor in a pulp mill. The temperature of the vapor in the last stage is usually about 55° C., although the cooling water would be only 15° C. Such a great difference in the temperature is used for cooling the gas mixture over 20° C., in order to maintain the vapor amount flowing with the noncondensable gases moderate.

The great temperature difference required by the discharge of gases thus determines the temperature of the last stage. If it could be less, the heat exchangers of an evaporation plant could be built much smaller than they are today. Or alternatively, energy could be saved by building more evaporation stages.

DETAILED DESCRIPTION OF THE DRAWING

Figure 1:
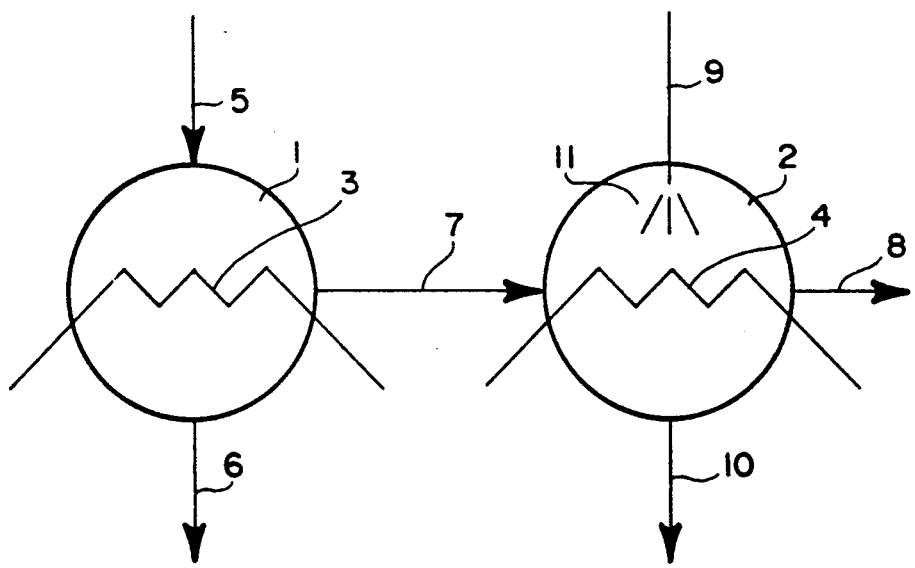
FIG. 1 is a schematic representation of an exemplary condenser apparatus according to the present invention, for practicing the method according to the present invention.

FIG. 1 schematically illustrates a condenser apparatus according to the present invention which utilizes two condensing indirect contact heat exchangers, which may be entirely distinct, or different sections of the same larger heat exchanger. The first and second sections are illustrated by reference numerals 1 and 2, while the first and second heat exchangers are indicated by reference numerals 3 and 4, the heat exchangers having surfaces. In the first heat exchanger 1 vapor to be condensed flows in line 5 through an inlet into contact with the heat exchanger 3. Condensate, such as water, is removed in line 6 through a condensate outlet, while a first remaining gas stream in line 7 exits the section 1 through a non-condensed gas outlet. The first remaining gas stream in line 7 is passed through an inlet to the second section 2, and passes in contact with the second heat exchanger 4. In the section, a medium for absorbing at least one non-condensible gas in the first remaining gas stream introduced in line 7 is itself introduced through a line 9 which comprises a means for directing the flow of the medium over the surface of the second heat exchanger 4. The medium is illustrated schematically at 11 in FIG. 1, and preferably comprises a liquid such as NaOH solution. Any remaining non-condensible and non-absorbed gases are discharged from section 2 in line 8, while the liquid with absorbed non-condensible gases, and any condensate, is withdrawn from section 2 in line 10.

By applying the present invention, the vapor of the last stage of an evaporation plant may be brought to the condenser, for example, at the temperature of 30° C. The gas mixture may be cooled in the first section of the condenser to the temperature level of 25° C. and it is possible to condense the majority of the water vapor in the mixture.

Two thirds of the remaining noncondensable gases may be absorbed and one third thereof is air. In the second section of the condenser gases are absorbed, for example, to NaOH-solution, which is used in the pulp cooking. Finally, pure air and an approximately corresponding amount of water vapor are discharged from the condenser after they have flowed through both sections.

An amount of NaOH corresponding to the loss in the pulp cooking process may be added as a sufficiently concentrated, for example as a 50% solution, to the circulation of the absorption medium of the second section of the condenser. The absorption medium leaving the condenser includes at that moment one third of salts, and it is not necessary to concentrate the medium through evaporation. The absorption liquid being discharged can be used as a component in white liquor.

The amount of the noncondensable gases being discharged from the second stage of the condenser is in our example thereafter less than one third of the original and approximately the same amount of vapor is discharged with the gases. The amount of the gases being pumped is less than a half compared with the gases being pumped from the known evaporation plants, although the temperature in the last stage of the evaporation plant has been decreased from the about 55° C. to about 30° C.

The present invention has been described in light of an example from the pulp industry. The purpose of it is not to restrict the invention to this one application, it may well be applied to all processes in which part of the gas mixture may be condensed and part of it absorbed.

I claim:

1. A method of separating gases from a mixture of condensible and non-condensible gases, using first and second indirect contact condensing heat exchangers each having a surface, comprising the steps of:
    (a) passing the mixture of condensible and non-condensible gases over the first heat exchanger to cool and condense gases, to produce a first condensate and a first remaining gas stream;
    (b) removing the condensate from the first remaining gas stream;
    (c) passing the first remaining gas stream over the second heat exchanger;
    (d) passing over the surface of the second heat exchanger a medium for absorbing at least one non-condensible gas in the first remaining gas stream, to produce a medium with absorbed gas, and a second remaining gas stream; and
    (e) separating the medium with absorbed gas from the second remaining gas stream.

2. A method as recited in claim 1 wherein step (d) is practiced by passing a liquid over the surface of the second heat exchanger.

3. A method as recited in claim 2 wherein step (d) is practiced by passing an NaOH solution over the surface of the second heat exchanger.

4. A method as recited in claim 3 wherein step (a) is practiced using the vapor from the last stage of a black liquor evaporation plant of a pulp mill as the mixture of condensible and non-condensible gases.

5. A method as recited in claim 4 comprising the further step of using the NaOH solution with absorbed gas from steps (d) and (e) as white liquor in kraft pulping in the pulp mill, without concentrating the solution after step (e).

6. A method as recited in claim 4 wherein step (d) is practiced by passing an approximately 50% NaOH solution over the surface of the second heat exchanger.

7. A method as recited in claim 4 wherein step (a) is practiced with the gas mixture at an initial temperature of about 30° C., the gas mixture being cooled to a temperature of about 25° C. by the first heat exchanger, to produce water as condensate.

8. A method as recited in claim 7 wherein step (d) is practiced to absorb about two thirds of the non-condensible gases in the first remaining gas stream, and so that the majority of the non-condensible gas remaining in the second remaining gas stream is air.

9. A method as recited in claim 1 wherein step (a) is practiced using the vapor from the last stage of a black liquor evaporation plant of a pulp mill as the mixture of condensible and non-condensible gases.

10. A method as recited in claim 9 wherein step (a) is practiced with the gas mixture at an initial temperature of about 30° C., the gas mixture being cooled to a temperature of about 25° C. by the first heat exchanger, to produce water as condensate.

11. A method as recited in claim 10 wherein step (d) is practiced to absorb about two thirds of the non-condensible gases in the first remaining gas stream, and so that the majority of the non-condensible gas remaining in the second remaining gas stream is air.

12. A condenser apparatus comprising:
    a first condensing indirect contact heat exchanger having a gas inlet, a condensate outlet, and a non-condensed gas outlet;
    a second condensing indirect contact heat exchanger having a gas inlet connected to said non-condensed gas outlet from said first heat exchanger, an absorbing medium outlet, a gas outlet, and a surface; and
    means for directing a flow of a medium for absorbing non-condensible gases over said surface of said second heat exchanger, so that the medium absorbs non-condensible gas, and is discharged from said absorbing medium outlet.

* * * * *